US008050715B1

(12) United States Patent
Cole

(10) Patent No.: US 8,050,715 B1
(45) Date of Patent: Nov. 1, 2011

(54) MODULAR MOBILE DEVICE

(75) Inventor: Joshua R. Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 776 days.

(21) Appl. No.: 12/114,528

(22) Filed: May 2, 2008

(51) Int. Cl.
*H04B 1/38* (2006.01)
*H04M 1/00* (2006.01)

(52) U.S. Cl. .................. 455/557; 455/550.1; 455/575.1; 455/575.8; 455/90.3

(58) Field of Classification Search ............... 455/550.1, 455/556.1, 557, 575.1, 575.8, 90.3
See application file for complete search history.

(56) References Cited

U.S. PATENT DOCUMENTS

| | | | |
|---|---|---|---|
| 5,918,189 | A | 6/1999 | Kivela |
| 7,184,807 | B2 * | 2/2007 | Shimamura ................ 455/575.6 |
| 7,197,302 | B2 | 3/2007 | Date et al. |
| 7,248,892 | B2 * | 7/2007 | White et al. ............... 455/550.1 |
| 7,421,269 | B2 * | 9/2008 | Kostiainen et al. .......... 455/418 |
| 7,536,199 | B2 * | 5/2009 | Josenhans et al. ......... 455/550.1 |
| 2003/0017848 | A1 * | 1/2003 | Engstrom et al. ............. 455/558 |
| 2004/0005910 | A1 * | 1/2004 | Tom .............................. 455/558 |
| 2005/0107046 | A1 | 5/2005 | Desbarats et al. |
| 2009/0088216 | A1 * | 4/2009 | Pichler et al. ................. 455/566 |

FOREIGN PATENT DOCUMENTS

WO    WO 0186922 A1 * 11/2001

OTHER PUBLICATIONS

Jason Chen, "Me-Mo Modular Cellphone Design," Internet page, Feb. 22, 2007, 2 pp., http://gizmodo.com/gadgets/cellphones/me+mo-modular-cellphone-design-238852.php.
Emily Turettini, "Bug Labs Modular Cellphone," Internet page, Dec. 4, 2007, 1 p., http://www.textually.org/textually/archives/2007/12/018177.htm.

* cited by examiner

*Primary Examiner* — Temesgh Ghebretinsae
*Assistant Examiner* — Gennadiy Tsvey

(57) ABSTRACT

Embodiments provide a shell module that accommodates form factors that define operational and aesthetic aspects of a modular device. Operational form factors of the shell module include constituent components that provide functional capabilities of the modular device. These constituent components are manipulated and powered by a core module, upon engagement thereto. In particular, the core module includes a power-source component for supplying power to the shell module and a processing component for managing the constituent components. The process of engagement includes executing a recognition procedure to determine a configuration of the shell module. The recognition procedure includes extracting available properties from the constituent components, utilizing the properties to determine an identity of each of the constituent components, and integrating operational control of the constituent components with the processing component. Accordingly, the core module communicates with the constituent components as if they are native to the core module.

19 Claims, 11 Drawing Sheets

MODULAR MOBILE DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The present invention relates generally to the field of mobile devices, and more particularly to mobile devices that have various components which may be disarticulated by physically separating a shell module and a core module.

Mobile devices, including personal digital assistants (PDAs), handsets, and other computing devices, often express aesthetic features or provide operational aspects that are specific to that particular mobile device. Each of these "form factors" are tailored to a specific ergonomic or functional role. Accordingly, the capabilities and design of a mobile device is limited to the form factors accommodated therein. However, it is often the situation that one type of mobile device with a first set of form factors (e.g., ruggedized case with a durable keypad for an exposed environment) may be inappropriate for another context, which may necessitate a type of mobile device with a second set of form factors (e.g., touch-sensitive screen with a clamshell hinge for an office environment). Purchasing multiple mobile devices to satisfy each anticipated context of use may be cost-prohibitive, while carrying multiple mobile devices may be cumbersome if not unmanageable.

Further, transferring information between multiple phones is inconvenient and unsophisticated. For instance, memory cards (e.g., SIM cards) allow for transferring certain static information between mobile devices. Memory cards and other present forms of information transfer require a plurality of steps to complete the transfer and are not adapted to transfer an entire "user identity" (e.g., operating systems, applications, preferences, and content) between multiple mobile devices. Accordingly, employing a base unit that is engageable with various shells comprising distinct form factors, would provide a robust method of extending the features and functions of a mobile device to satisfy the demands of a particular context, and enhance a user's experience when integrating a system architecture of the mobile device with disparate capabilities.

SUMMARY

This Summary is provided to introduce a selection of concepts in a simplified form that are further described below in the Detailed Description. This Summary is not intended to identify key features or essential features of the claimed subject matter nor is it intended to be used as an aid in determining the scope of the claimed subject matter. The present invention is defined by the claims.

Embodiments of the invention have several practical applications in the technical arts, including apportioning operation control of constituent components integral within a shell module to a core module. Typically, the components of the core module and the constituent components of the shell module are mutually exclusive. For instance, the shell module may include the constituent components that provide the functional capabilities of the modular mobile device (e.g., keyboard, touchpad, camera element, display, etc.) and aesthetic aspects that influence the external appearance of the modular mobile device (e.g., hinged clamshell design, a ruggedized case, a slider mechanism, a headset jack, a charging jack, a PDA-style case, or a thinline-style case). Accordingly, these form factors facilitate replicating features of a particular style of handset device. Upon engagement of the core module with the shell module, the core module is adapted to supply power to the shell module, thereby activating the constituent components and to manage the constituent components as though they were native to the core module. Accordingly, a variety of form factors—combining to simulate a particular handset—may be experienced by a user upon engaging the core module with a variety of distinct shell modules. Advantageously, the user extends the capabilities of a handset by accessorizing the core module with shell modules, rather than carrying multiple devices or compromising on feature and/or functionality requirements.

Embodiments of the present invention generally relate to a computerized method for engaging a core module and a shell module to function in conjunction as a modular mobile device. Initially, the computerized method includes, receiving an indication of the shell module attaching to the core module. In particular instances, receiving an indication includes, inter alia, the following processes: detecting an operable coupling of a power-transfer connector exposed by the core module to a shell-power connector located on the shell module, where the power-transfer connector is electrically connected to the power-source component thereby allowing the core module to impart power to the shell module; and detecting an operable coupling of an input/output (I/O) connector exposed by the core module to a shell I/O located on the shell module, wherein the I/O connector is communicatively connected to the processor component.

Typically, a power-source component and a processing component are integral to the core module while the shell module includes constituent components that are mutually exclusive from the components of the core module. As such, power may be imparted to the shell module from the power-source component, thereby attempting to activate the constituent components of the shell. When activated, a recognition procedure is executed to determine a configuration of the shell module. In embodiments, the recognition procedure includes extracting available properties from the constituent components and utilizing the properties to determine an identity of each of the constituent components.

Upon recognizing the constituent components, operational control of the constituent components is integrated into the processing component. Accordingly, the processing component may manage the constituent components as through they are native to the core module. In operation, managing may include receiving a user-initiated input from a first recognized constituent component at the processing component, and controlling operation of a second recognized constituent component via a command generated by the processing component in response to the user-initiated input. Further, when acting in conjunction as a modular device, the shell component may maintain awareness that it is in operable communication with the core component by monitoring the integrity of the coupling of the I/O connector to the shell I/O.

A second aspect of an embodiment takes the form of a modular mobile device for apportioning operation control of constituent components integral within a shell module to a core module. Typically, the modular mobile device includes the shell module and the core module that operate in concert upon engagement of an input/output (I/O) interface exposed by the core module and an I/O interface located on the shell module. In an exemplary embodiment, the shell module includes a set of form factors replicating features of a particular style of handset device. In particular, the form factors may include, but are not limited to, aesthetic aspects influencing the external appearance of the modular mobile device and the constituent components that provide a portion of the functional capabilities of the modular mobile device. In an exemplary embodiment, the core module is configured to manage the constituent components upon engagement with the shell module.

In addition, the core module includes but is not limited to the following elements: a power-source component to supply power to the shell module, thereby activating the constituent components such that they are detectable by the core module; a processing component to control the operations of the constituent components upon the detection thereof; and a radio component to promote communication between the modular mobile device and a wireless network. In one instance, the components of the core module and the constituent components of the shell module are mutually exclusive.

In other embodiments, the core module may further include one or both of the following elements: a light-emitting element actuated according to an illumination scheme; or a memory component locally storing a system architecture including an operating system, applications, shell profiles, user-defined preferences, component drivers, and/or a file structure. Typically, the system architecture is transferable to another shell module upon engaging the core module therewith. In an exemplary design, the memory component is accessible by the processing component to facilitate operably controlling the constituent component.

In a further aspect, embodiments of the present invention are directed toward a method for disengaging a core module and a shell module previously functioning as a modular mobile device. Initially, the method includes providing the shell module and the core module. Typically, a power-source component and a processing component are integral to the core module while the shell module includes constituent components that are mutually exclusive from the components of the core module. In addition, operational control of the constituent components is integrated within the processing component such that the processing component manages the constituent components as native to the core module. The shell module and the core module may be detached by, at least, the following steps: decoupling a power-transfer connector exposed by the core module from a shell-power connector located on the shell module, thereby disallowing the core module to impart power to the shell module; decoupling an input/output (I/O) connector exposed by the core module from a shell I/O located on the shell module, thereby disarticulating operable control of the constituent components from the processing component; rendering the core module a stand-alone device; and maintaining functionality of the processing component as previously instructed when engaged to the shell component. In an exemplary embodiment, maintaining functionality of the processing component includes but is not limited to, storing instructions received from a corollary shell module previously integrated with the core module, and continuing to exert operational control of the corollary shell module according to the instructions.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figures 1, 2:
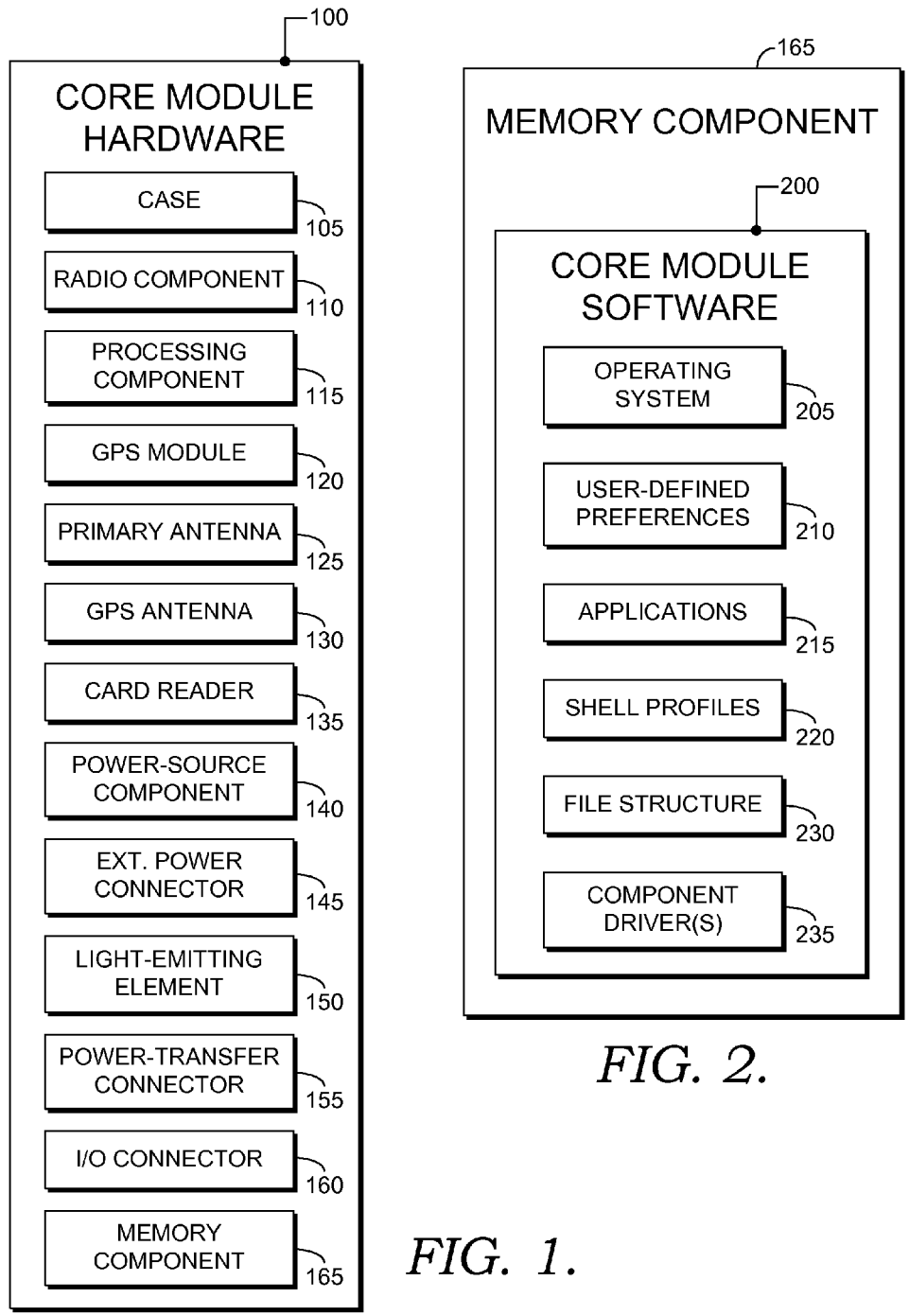
FIG. 1 is diagrammatic view of an exemplary set of hardware components that are accommodated on a core module, in accordance with an embodiment of the present invention.
FIG. 2 is a diagrammatic view of an exemplary set of software components embodied on a memory component of the core module for use in implementing embodiments of the present invention.

Embodiments provide a shell module that accommodates form factors that define the functional and aesthetic aspects of a modular mobile device. The operational form factors of the shell module (i.e., constituent components that provide functional capabilities of the modular device), may be manipulated and powered by a core module, upon engagement thereto. In particular, the core module includes a power-source component for supplying power to the shell module and a processing component for managing the operational form factors. The process of engagement may include executing a recognition procedure to determine a configuration of the shell module. In particular instances, the recognition procedure includes but is not limited to extracting available properties from the constituent components, utilizing the properties to determine an identity of each of the constituent components, and integrating operational control of the constituent components with the processing component.

In an exemplary embodiment, integrating operation control includes, inter alia, the following steps: comparing the properties of the identified constituent components against shell profiles to determine capabilities of the identified constituent components; appending the determined capabilities to a device menu structure; utilizing the device menu structure to instantiate a driver element within the processing component to operably control each of the constituent components; and rendering the constituent components functional. In other embodiments, integrating operation control includes, inter alia, the following steps: determining that the properties of one or more of the identified constituent components are absent from the shell profiles; automatically installing capabilities associated with one or more of the identified consistent components based on properties thereof; and appending the installed capabilities to the device menu structure. As such engagement allows the processing component to manage the constituent components as through they are native to the core module (i.e., operating in concert with the components integral to the core module).

Various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate that embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments relate to a modular mobile device for apportioning operation control of constituent components integral within a shell module to a core module. As illustrated at FIGS. 1 and 2, the core module includes various hardware and software components. With reference to FIG. 1 in particular, a diagrammatic view of an exemplary set of hardware components 100 that are accommodated on a core module is shown, in accordance with an embodiment of the present invention. Generally, the set of hardware components 100 includes one or more of the following discrete constituents: a case 105; a radio component 110 (e.g., a main board, a processor, a memory store, and essential electronics) to facilitate communication between the modular mobile device and a wireless network; a processing component 115 (e.g., to control the operations of the constituent components upon detection thereof). The processing component 115, as shown in FIG. 1, may take the form of various types of processors that are commonly deployed in a personal computing device, a handheld device, a consumer electronic device, and the like.

Further, the set of hardware components 100 may include one or more of the following discrete constituents: a GPS module 120; a primary antenna 125, a GPS antenna 130, a card reader 135 (e.g., a Micro SD card reader) for uploading/downloading to transferable memory devices; a power-source component 140 (e.g., battery, solar cell, connection to an electrical outlet) to supply power to the shell module thereby activating the constituent components such that they are detectable by the core module. The case 105, in embodiments, may be configured to be disposed on, or insert within, a shell module. Advantageously, because there are a reduced number of members in the set of hardware components 100, as they are housed on the shell module instead, the dimensions of the case 105 to envelop the members may be minimal.

In additional embodiments, the set of hardware components 100 includes one or more of the following discrete constituents: an external power connector 145 in operable communication with the power-source component 140; and a light emitting element (LED) 150 that is typically actuated according to an illumination scheme. The illumination scheme is generally a set of rules that cause the LED 150 to activate based on a status of the modular mobile device. For instance, the LED 150 may be instructed by the illumination scheme to activate at a particular power state of the power-source component 140, or to alert a user upon successful engagement of the core module with the shell module (e.g., by monitoring an I/O interface). Further, the LED 150 may function separately from the illumination scheme to respond to user-initiated actuations. By way of example, the LED 150 may provide diagnostic feedback (e.g., by flashing particular light patterns) to apprise the user of present or potential errors in operation. Although described as a light display herein, the LED 150 may be any mechanism that communicates information to the user and may include one or more of the following embodiments: a fluorescent light; an incandescent light; an LCD; a laser; an electroluminescent light source; a chemical light; a halogen light, a flexible light wire, or an audio-emitting mechanism.

The set of hardware components 100 may additionally include one or more of the following discrete constituents: a power-transfer connector 155 electrically connected to the power-source component 140 that allows constituent components housed in the shell module to draw power therefrom; and an I/O connector 160 communicatively connected to the processing component 115 that allows the core module to communicate with constituent components and other peripheral elements as if they were native to the core module. It should be understood that the connections may be indirectly or directly made via wired or wireless technology. As discussed more fully below, the power-transfer connector 155 and the I/O connector 160 comprise an I/O interface on the core module that can be engaged to an I/O interface on a compatible shell module. This I/O interface may be a single connector or a plurality of separate connectors. In one instance, the I/O interface is one or more connectors that, when connected, enable the processing component 115 to monitor the integrity of the connection and to detect which constituent components are active and adjust the core module software accordingly. These connectors may be a multi-pin blade style connector that has pins assigned for data transfer and charging pass-through, or any other connector or technology that supports communication/power-transfer between devices.

The set of hardware components 100 may additionally include a memory component 165 for locally storing a system architecture (see reference numeral 200 of FIG. 2). In operation, the system architecture is transferable from one shell module to another upon engaging the core module therewith. Thus, a "user identity" is localized at the core module and is maintained in each configuration of the modular mobile device. Further, the memory component 165 is accessible by the processing component 115 to facilitate operably controlling the constituent components of a shell module.

Although various different configurations of the set of hardware components 100 have been described and illustrated in FIG. 1, it should be understood and appreciated by those of ordinary skill in the art that other types of suitable components that add functionality or structure are contemplated herein, and that embodiments of the present invention are not limited to those components described above. For instance, in implementations of the core module, one or more of a Bluetooth™ transceiver, a display panel, or an input mechanism may be provided, as well as any constituent components employed by the shell module. But, in an exemplary embodiment, the set of hardware components 100 and the constituent components (see reference numeral 325 of FIG. 4) are mutually exclusive.

Turning now to FIG. 2, a diagrammatic view of an exemplary set of software components 200 embodied on the memory component 165 of the core module for use in implementing embodiments of the present invention is shown. Generally, the set of software components 200 includes one or more of the following discrete constituents: an operating system 205 (e.g., Java, BREW, and AMS environments); user-defined preferences 210 or instructions embodied on computer-readable media; applications 215 (e.g., web browser, calendar, PIM, contact suite, clients for preloaded services); and shell profiles 220.

Generally, the shell profiles 220 are applications that interface and correspond to various shell modules. For instance, upon attaching a particular shell module and querying the constituent components to extract properties therefrom, the properties of the constituent components may be compared against the shell profiles 220 to identify, and determine the capabilities of, the responsive constituent components. In an exemplary embodiment, determining the capabilities includes interrogating the shell profiles 220 to select an appropriate predefined list of capabilities intrinsic to the constituent components. This list of capabilities exposes the functionality inherent in the shell module. Upon identifying the proper list of capabilities, it may be appended to a device menu structure, thereby merging the functionality of the shell module to that of the core module. In one instance, merging functionality may comprise determining how the applications 215 and the operating system 205 in the core module will interact with the constituent components (e.g., camera element, keyboard, display) inherent in the form factors of the shell unit and/or leveraging the new capabilities written to the device menu structure to manage and communicate with the constituent components.

In another embodiment, the shell profiles 220 comprise a set of rules, where the rules are mapped to capabilities available on an inclusive list of shell modules. Typically, each listed shell module is associated with a predefined set of constituent components. As such, each capability that may be built into the listed shell modules may be incorporated in one or more of the shell profiles 220. Thus, the operation of a shell module, and constituent components therein, may be facilitated by extracting information describing its capabilities from a corresponding shell profile 220 and assembling the extracted capabilities to the current capabilities of the core module. In one instance, the facilitating operation may be accomplished by enabling and disabling capabilities within the device menu structure based on a shell module recognized in the shell profiles 220.

By way of example only, if a QWERTY keyboard is one of the constituent components housed by an engaged shell module, the core module will understand the capabilities associated with the QWERTY keyboard and assemble them into the standard operation of the core module. These capabilities may include, the receipt of alpha-numeric input, enablement of a document-reader application, and activation of messaging software. However, if only a number pad is available on the shell module, these capabilities listed above may be disabled as need for editing and messaging functionality is negated, or these capabilities may be leveraged via the number pad with a different input expectation, such a multiple-tap or predictive text method. Thus, the shell profiles 220 allow the core module to manage disparate remote components and enable the core module to accept a variety of inputs from many different schemes without the need for translation between modules.

If a shell module engaged to the core modules does not match any of the shell profiles 220 available in the discrete list, the core module may revert to a dormant state, continue as if no shell module were attached, or attempt to learn the capabilities of the shell module in order to function in conjunction therewith. In one instance, new software is pushed from the constituent components to the core as a new shell profile 220 (e.g., flash chip in the shell module that installs a driver on the core module via a downloadable shell profile). In another instance, the appropriate capabilities associated with the engaged shell module are automatically downloaded from a website via a wired or wireless uplink at the core module. In either situation, upon installing the proper capabilities and teaching itself how to manage the constituent components utilizing the installed capabilities, the core module regards the constituent components as if they were native to the device.

The set of software components 200 may further include one or more of the following discrete constituents: a file structure 230, component driver(s) 235; or any other software related to the system architecture of a modular mobile device. In embodiments, the shell profiles 220 detail properties and capabilities of known shell module configurations. The configurations may be uniquely indexed to facilitate the identification of constituent components accommodated by an attached shell module. Accordingly, the shell profiles 220 allow the integration of recognized capabilities into a menu structure within the operating system 205, where the menu structure partially facilitates managing the functionality of the modular mobile device. By way of example, managing the functionality may include accepting input from input mechanisms, such as keyboards, buttons of various types, touch screens, etc, and relating information to output mechanisms of various types, such as speakers, displays, LEDs, etc.

The file structure 230, is generally provided for allowing information, content, and software to be selectively accessed and manipulated in accordance with capabilities of constituent components located on an attached shell module. In addition, the component driver(s) 235 may allow for integration of native core components (e.g., the set of hardware components 100 illustrated in FIG. 1) with the constituent components of an engaged shell module via the operating system 205. Although various different configurations of an exemplary set of software components 200 embodied on the memory component 165 have been described and illustrated in FIG. 2, it should be understood and appreciated by those of ordinary skill in the art that other types of suitable components that implement functionality of the components of the shell module and/or the core module are contemplated herein, and that embodiments of the present invention are not limited to those components described above. For instance, in implementations of the memory component 165, the system architecture may be configurable based on a type of shell module presently in communication with the core module. But, in an exemplary embodiment, the system architecture of the core module is agnostic to the form factors of the shell module.

Figure 3:
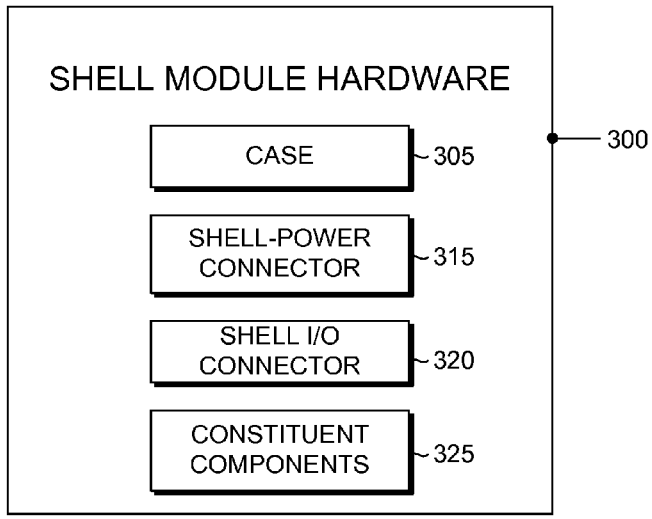
FIG. 3 is diagrammatic view of an exemplary set of hardware components that are accommodated on a shell module, in accordance with an embodiment of the present invention.

With reference to FIG. 3, a diagrammatic view of an exemplary set of hardware components 300 that are accommodated on a shell module, in accordance with an embodiment of the present invention, are shown and are described hereinbelow.

In general, the shell module includes a set of form factors that replicate features of a particular style of handset device. In addition, the form factors include aesthetic aspects and constituent components. In one instance, the aesthetic aspects influence the external appearance of the modular mobile device. In another, the constituent components provide a portion of the functional capabilities of the modular mobile device.

Generally, the exemplary set of hardware components 300 includes one or more of the following discrete elements: a case 305; a shell-power connector 315; a shell I/O connector 320; and the constituent components 325. The case 305 may replicate the outer housing of any presently known modular mobile device or handset or may include a combination of features exhibited by these devices.

In embodiments, the case 305 may simulate a handset that is specifically designed to have an aesthetically pleasing form factor and/or to take advantage of a specific set of popular features. By way of example, the case 305 may emulate a phone that is designed with visually appealing aesthetic aspects (e.g., a hinged clamshell design, a ruggedized case, a slider mechanism, a headset jack, a charging jack, a PDA-style case, a ruggedized clamshell design, a QWERTY messaging side-flip, a touchscreen and QWERTY PDA, a micro-shell, and/or a thinline-style case) and includes functionality identified as expected in modern cell phones. Typically, the functionality is embodied in the constituent components, more fully discussed below with reference to FIG. 4.

Figure 8:
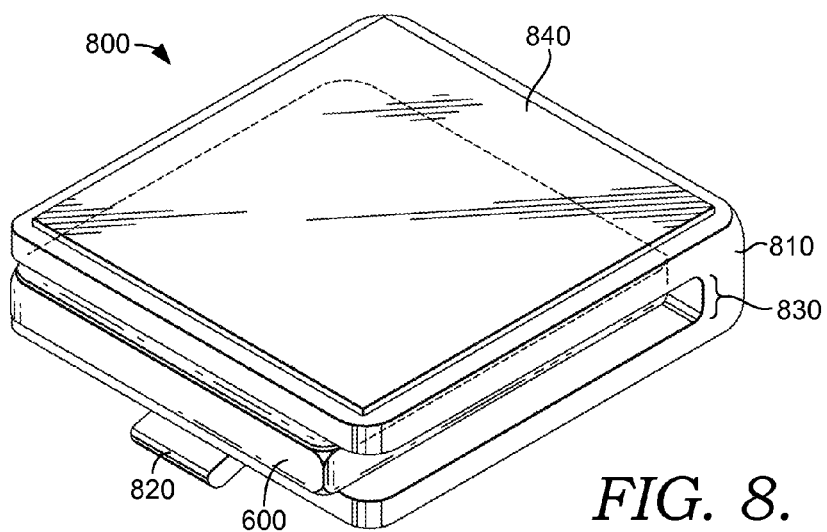
FIGS. 8 and 9 depict a perspective view of an exemplary modular mobile device configured as a micro-shell, in accordance with an embodiment of the present invention.
Figure 9:
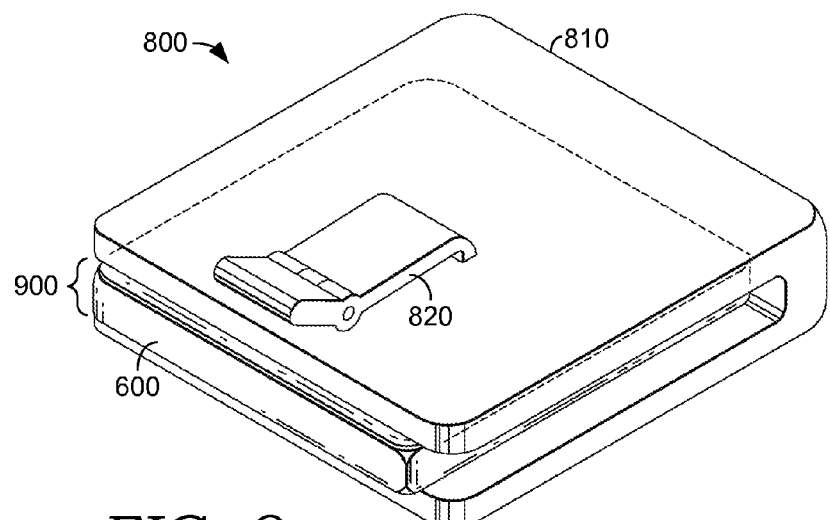

The aesthetic aspects of a ruggedized case, a messaging design, a PDA-style case, and a micro-shell, which may be implemented as features of the case 305, will now be discussed. Initially, the ruggedized case encompasses a handset that is designed for durability and resistance to damage and/or harsh environmental elements that pose risk of damage beyond the average consumer's normal usage. Accordingly, the ruggedized case may be over-engineered for durability. The messaging design encompasses a handset designed for messaging operations and often incorporates within the case 305 a form factor that is particularly suited to typing, such as a QWERTY keyboard, a landscape flip, a predictive-text capability, or any keypad layout or software that facilitates typing. Accordingly, the case 305 designed for messaging may make compromises in form factors that favor messaging over voice calls and other typical mobile device usage. The PDA-style case is designed to promote connectivity to other computing devices. In instances, promoting connectivity includes installing internet browsers, providing ability to read and interact with documents, providing the ability to support complex third-party content, and providing the ability to access and manage enterprise email and calendars. Accordingly, the PDS-style case will complement these abilities by offering a display and input mechanism that supports data-entry and complex-content presentation. The micro-shell, as depicted in FIGS. 8 and 9, is a miniature module device with a compact exterior that serves as the case 305. Because the core module typically includes just essential electronic components, it can be reduced in size, thus, allowing the micro-shell to be reduced in size as well. Further, the reduced number of form factors that are built into the micro-shell are compact, thereby making the shell module more convenient to carry.

Although various styles of the case 305 have been described above, it should be understood and appreciated by those of ordinary skill in the art that other types of suitable form factors, or combinations of the form factors above, that provide aesthetic aspects may be used, and that embodiments of the present invention are not limited to those cases and form factors described herein.

The shell I/O connector 320 is communicatively connected to the constituent components and is operably coupled to the I/O connector (see reference numeral 160 of FIG. 1) of the core module during engagement of the shell module therewith. The shell-power connector 315 is electrically connected to the constituent components and is operably coupled to the power-transfer connector (see reference numeral 155 of FIG. 1) of the core module during engagement of the shell module therewith. As discussed above, the connection may be directly or indirectly made by wired or wireless technology. In addition, the shell-power connector 315 and the shell I/O connector 320 comprise the I/O interface located on the shell module that is engageable to the I/O connector housed on the core module. These connectors 315 and 320 may be any type of connector or linking technology that mechanically mates to, or is communicatively comparable with the connectors exposed by the core module.

Figure 4:
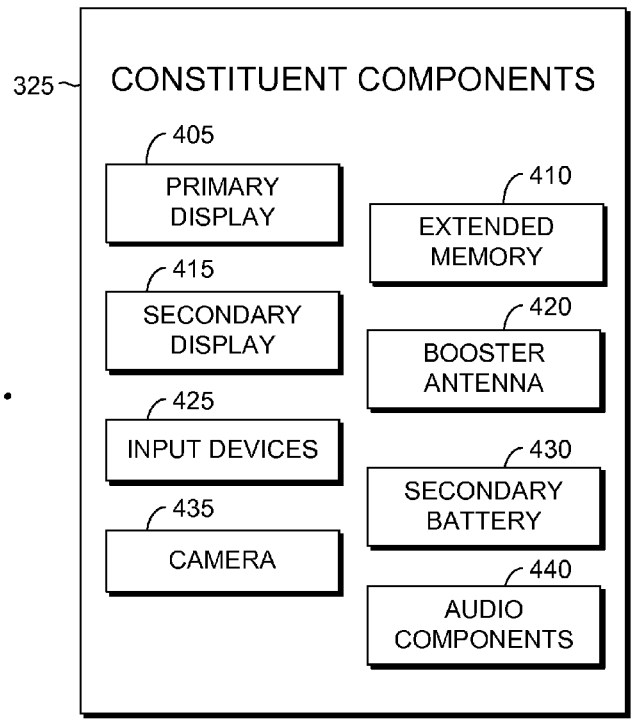
FIG. 4 is a diagrammatic view of an exemplary set of constituent components that promote divergent capabilities of shell module hardware, in accordance with an embodiment of the present invention.

With reference to FIG. 4, a diagrammatic view is illustrated that shows an exemplary set of the constituent components 325 that promotes divergent capabilities of shell module hardware, in accordance with an embodiment of the present invention. The constituent components 325 include, but are not limited to, one or more of the following components: a primary display 405 (e.g., touchscreen, display panel, capacitive screen, LCD); an extended memory 410 that may retain data in conjunction with the memory component (see reference numeral 165 of FIG. 2) of the core module; a secondary display 415 (e.g., external display on a flip-style phone); a booster antenna 420 that may function in series or in parallel with the antennas disposed on the core module (see reference numerals 125 and 130 of FIG. 1); input devices 425 (e.g., keypad, trackball, voice recognition, touchscreen); a secondary battery 430 that may work in conjunction with the power-source component (see reference numeral 140 of FIG. 1) of the core module, such as for sharing power reserves upon disengagement; a camera 435; or audio components 440 (e.g., a speaker, a receiver, an audible alert). These constituent components 325 may be combined in any manner to provide the functionality of the shell module, and, implicitly, to provide a portion of the functionality of the modular mobile device. Further, one of ordinary skill in the art will understand that other constituent components 325 may be employed that are available in the relevant field. As such, embodiments of the present invention are not limited to constituent components described herein but encompass a wide range of mechanical and/or electrical devices that may be disposed on, or operably coupled to, the shell module.

An exemplary module mobile device composed of a core module and a shell module will now be described with reference to the accompanying drawings. The drawings and the associated descriptions are provided to illustrate embodiments of the present invention and not to limit the scope thereof. Reference in the specification to an "embodiment" is intended to indicate that a particular feature, structure, or characteristic described in connection with the embodiment is included in at least one embodiment of the invention. Further, the appearance of the phrase "in one embodiment" in various places in the specification are not necessarily all referring to the same embodiment.

Figure 5:
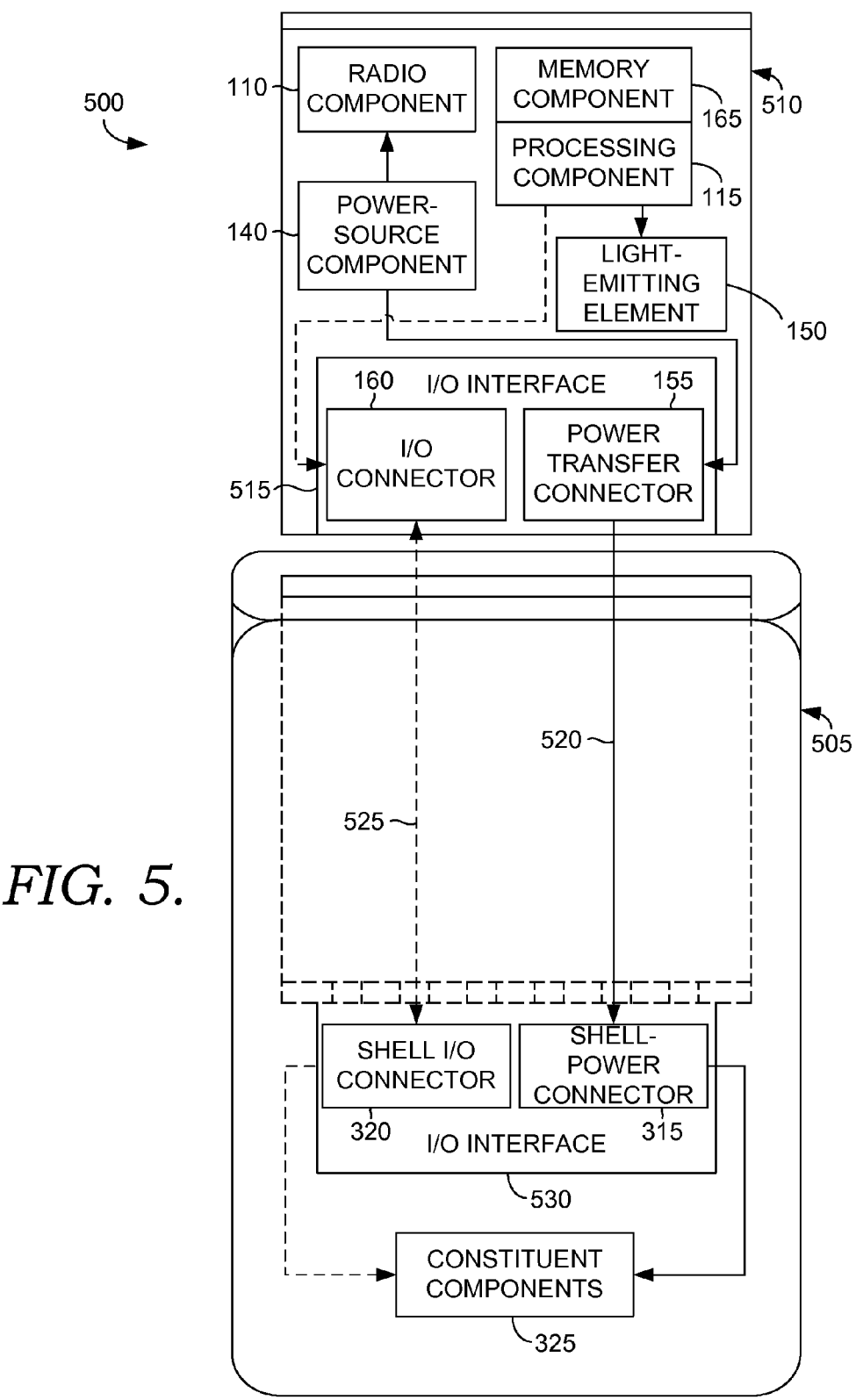
FIG. 5 is a schematic diagram of an exemplary system architecture suitable for use in implementing a modular mobile device with disarticulated components, in accordance with an embodiment of the present invention.

Referring to FIG. 5, a schematic diagram of an exemplary system architecture 500 suitable for use in implementing a modular mobile device with disarticulated components is illustrated, in accordance with an embodiment of the present invention. It should be noted that throughout the drawings, reference numerals are reused to indicate correspondence between referenced elements. Initially, the schematic diagram portrays an illustrative shell module 505 physically detached from a core module 510. However, for the purpose of explanation, the shell module 505 and the core module 510 will be described as being engaged via operable couplings 520 and 525.

In embodiments, the shell module 505 includes the constituent components 325 and an I/O interface 530 that is comprised of the shell I/O connector 320, the shell-power connector 315, and any other connectors or coupling components that support communication with the core module 510. In embodiments, the core module 510 includes the radio component 110, the processing component 115, the power-source component 140, the light-emitting element 150, the memory component 165, and an I/O interface 515. In one instance, the I/O interface 515 may include the I/O connector 160, the power-transfer connector 155, and any other connectors or coupling components that support communication with the core module 510. Accordingly, in this embodiment, the shell module includes constituent components that are mutually exclusive from the components of the core module.

Generally, the I/O connector 160 is communicatively connected (see dashed lines of FIG. 5) to the processing component 115, which is in direct or indirect communication with the memory component 165 and the light-emitting component 150. Generally, the power-transfer connector 155 is electrically (see solid lines of FIG. 5) connected to the power-source component 140 thereby allowing the core module 510 to impart power to the shell module 505. The shell I/O connector 320 may be communicatively connected to the constituent components 325 and is operably coupled 525 to the I/O connector 515 of the core module 510 during engagement of the shell module 505 therewith. The shell-power connector 315 is electrically connected to the constituent components 325 and is operably coupled to the power-transfer connector 155 of the core module 510 during engagement of the shell module 505 therewith.

When the I/O interface 530 and the I/O interface 515 are engaged, the core module 510 and a shell module 505 tend to function as a single modular mobile device. The procedure of establishing engagement of the core module 510 and the shell module 505 will now be discussed. Initially, an indication that the shell module 505 is initiating a connection to the core module 510 is received. Upon detecting the operable coupling 525 and 520 of the I/O interface 515 exposed by the core module 510 to the I/O interface 530 located on the shell module 505, power may be imparted to the shell module 505 from the power-source component 140, thereby attempting to activate the constituent components 325 of the shell module 505. However, incident to administering power from the power-transfer connector 155 to the shell-power connector 315 via the operable coupling 520 and monitoring the data transfer between the shell I/O connector 320 and the I/O connector 160 exposed by the core module 510, a determination of whether one or more of the constituent components 325 are activated is performed. If each of the constituent components 325 remain deactivated, an error message indicating an incompatible shell module is produced. In this instance, the state of the core module may remain unchanged from its preceding connection to another shell module.

But, if one or more of the constituent components 325 become activated, a recognition procedure to determine a configuration of the shell module 505 is executed. In an exemplary embodiment, the recognition procedure includes, inter alia, one or more of the following steps in no particular order: extracting available properties from the constituent components 325 via the operable coupling 525; utilizing the properties to determine an identity of each of the constituent components 325; and integrating operational control of the constituent components 325 with the processing component 115. As such, the processing component 115 may manage the constituent components 325 as through they are native to the core module 510. Incident to establishing operation control of the constituent components 325, the core module 510 may maintain awareness that the shell component 505 is in operable communication therewith by monitoring the integrity of the operable coupling 520 and/or 525 of the I/O interfaces 515 and 530.

In one embodiment of integrating operation control, as discussed above, properties may be extracted from the constituent components 325 and communicated to the core module 510. The properties may be compared against shell profiles to determine capabilities of the constituent components 325. As more fully discussed above, the shell profiles may include a list of the capabilities intrinsic to the constituent components 325. These capabilities may be appended to a device menu structure, thereby allowing the processing component 115 to manage the constituent components 325 in concert with the components 110, 140, and 165 integral to the core module 510. In another embodiment, the properties of the constituent components 325 may be determined absent from the shell profiles. In this case, capabilities associated with the consistent components 325 may be automatically installed based on properties thereof. Installation may be from the constituent components 325 themselves, an extended memory at the shell module 505, or a third party (e.g., server accessible via a wireless connection). These installed capabilities may be appended to the device menu structure, similar to above. The device menu structure facilitates integrating operation control by, at least, instantiating a driver element within the processing component 115 to operably control each of the constituent components 325 and/or rendering the constituent components 325 functional.

Persons familiar with the field of the invention will realize that although the recognition procedure is described as involving a plurality of discrete steps, the scope of the invention may embrace various procedures which are different from the specific illustrated embodiment above. Therefore it is emphasized that embodiments of the invention are not limited only to the procedural embodiments but may include a wide variety of recognition processes that fall within the spirit of the claims. For instance, the recognition procedure may be implemented using the steps of interrogating the constituent components 325 to determine whether properties are available for communication, and if the properties are unavailable, producing an error message; otherwise, identifying the constituent components 325 in accordance with the properties extracted therefrom.

Although described above as a mechanical coupling, the engagement may comprise a wired connection, a wireless connection, or a combination thereof. In addition, the engagement may include, without limitation, one or more wLANs and/or wWANs for remote operable coupling. Such networking environments are commonplace in offices, enterprise-wide computer networks, intranets, and the Internet; thus, the remote operable engagement is not further described herein. Although the various components of FIG. 5 are shown with lines for the sake of clarity, in reality, delineating various components is not so clear, and metaphorically, the lines would more accurately be grey or fuzzy. Further, although some components of FIG. 5 are depicted as single blocks, the depictions are exemplary in nature and in number and are not to be construed as limiting (e.g., although only one processing component 115 is shown, many more may be communicatively connected to the I/O connector 160).

Figure 6:
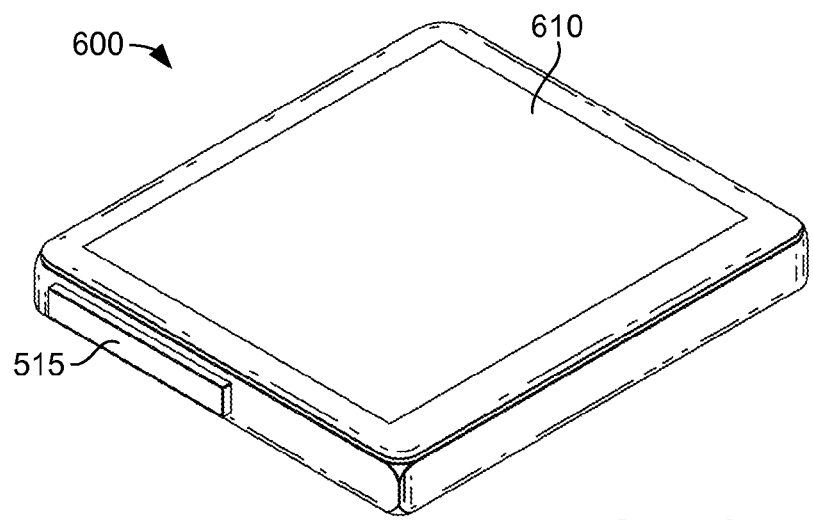
FIGS. 6 and 7 depict a perspective view of an exemplary core module, in accordance with an embodiment of the present invention.
Figure 7:
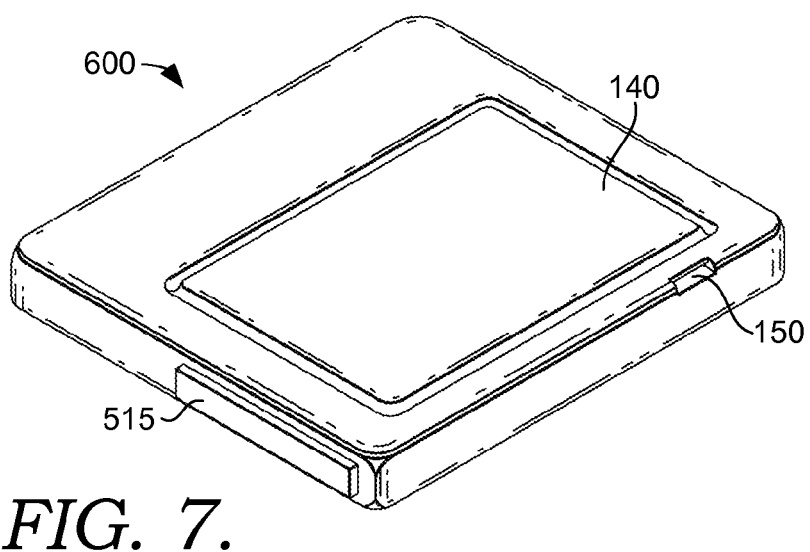

Turning now to FIGS. 6 and 7, a perspective view is illustrated showing an exemplary core module 600, in accordance with an embodiment of the present invention. Initially, because the core module 600 includes mainly essential electronic and telecommunication components, the dimensions of the core module 600 are relatively minimal. These essential components may include a display panel 610, the power-source component 140 (e.g., battery), the light-emitting element 150, the I/O connector 515, the processing component (not shown), and the memory component (not shown). Accordingly, the core module 600 may assume a compact configuration that is easily transportable and can be transparently engaged with shell components having streamlined form factors.

Referring to FIGS. 8 and 9, a perspective view of an exemplary modular mobile device 800 configured as a micro-shell 810 is shown, in accordance with an embodiment of the present invention. Generally, the micro-shell 810 is a specific shell module designed for the compact form of the core module 600. Essentially, the micro-shell 810 is configured to be minimal in shape but retain substantial interactivity with a user. The micro-shell 810 is wearable, particularly during exercise, and includes holster-style opening 900 with a physical retention mechanism 830 to receive and capture the core module 600. In addition, the micro-shell includes a small touch-sensitive screen 840 for UI input and output, and/or a rotating clip 820 mounted opposed to the touch-sensitive screen 840. In an exemplary embodiment, the micro-shell 810 does not include a microphone, speaker, or headphone jack, thereby allowing for reduction of volume required by the micro-shell 810.

But, in some instance, the micro-shell 810 may include a near-range wireless transceiver (e.g., Bluetooth™ element) to communicate with a compatible headset. As discussed above, the core module 600 remains in the state established during a connection to a preceding shell module. As such, upon disengagement of the micro-shell 810 and the core module 600, the headset will maintain awareness of, and connection with, the wireless transceiver. That is, upon physical detachment, the configurations of the core module are persistent until a reconfiguration is instantiated upon detecting a subsequent connection to a disparate shell module.

Figure 10:
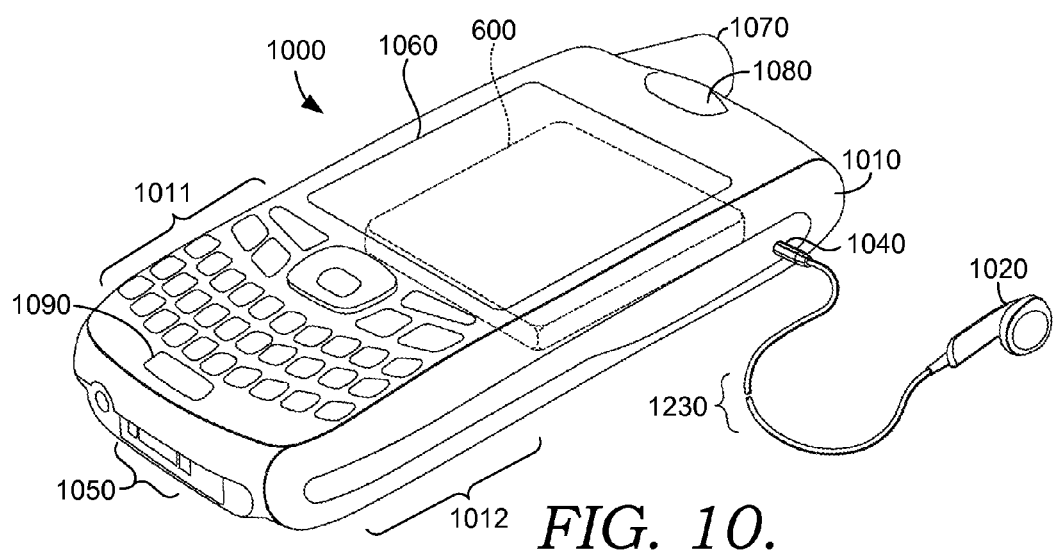
FIGS. 10 and 11 depict a perspective view of an exemplary modular mobile device and a core module, respectively, for the purpose of demonstrating the feature of persistent configuration, in accordance with an embodiment of the present invention.
Figure 11:
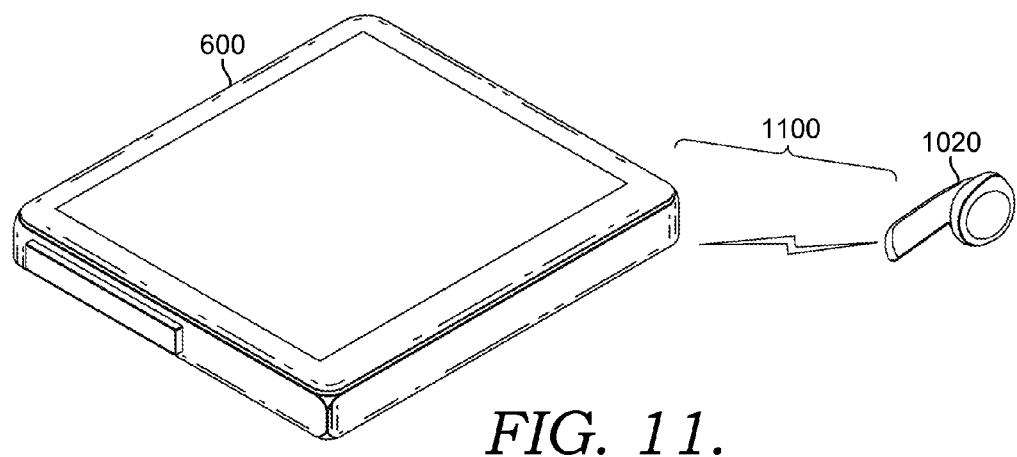

The feature of persistent configuration of the core module 600 will be discussed below with respect to FIGS. 10 and 11, which depict a perspective view of an exemplary modular mobile device 1000 and the core module 600, respectively, for the purpose of demonstrating the feature of persistent configuration, in accordance with an embodiment of the present invention. Initially, the modular mobile device 1000 includes a shell module 1010 that is connected to a headset 1020 via a wire 1230 to port 1040. The modular mobile device 1000 includes form factors that simulate a PDA with a QWERTY keyboard and a touchscreen display 1060. The form factors, as illustrated, include the constituent components of a recharging jack 1050, a microphone 1090, a speaker 1080, the QWERTY keyboard 1011, and the touchscreen display 1060. The form factors may also include aesthetic features of a slim profile 1012, as illustrated.

Generally, disengaging the core module 600 and the shell module 1010 previously functioning as the modular mobile device 1000 includes detaching the shell module 1010 from the core module 600. In particular, detaching may include decoupling a power-transfer connector (not shown) exposed by the core module 600 from a shell-power connector (not shown) located on the shell module 1010, thereby disallowing the core module 600 to impart power to the shell module 1010. In addition, detaching may further include decoupling an I/O connector (not shown) exposed by the core module 600 from a shell I/O connector (not shown) located on the shell module 1010, thereby disarticulating operable control of the constituent components 1011, 1050, 1060, 1080, and 1090 from the processing component (not shown). Accordingly, the core module 600 is rendered a stand-alone device, as depicted in FIG. 11. But, the core module 600 still may maintain functionality of the processing component as previously instructed when engaged to the shell module 1010. By way of example, processing component of the core module 600 remains in communication with headset 1020 over a wireless link 1100 facilitated by a near-range wireless transceiver (not shown), as discussed more fully above with reference to the micro-shell. In embodiments, maintaining functionality comprises storing instructions received from the headset 1020 previously integrated with the core module 600, and continuing to exert operational control of the headset 1020 according to the instructions.

Figure 12:
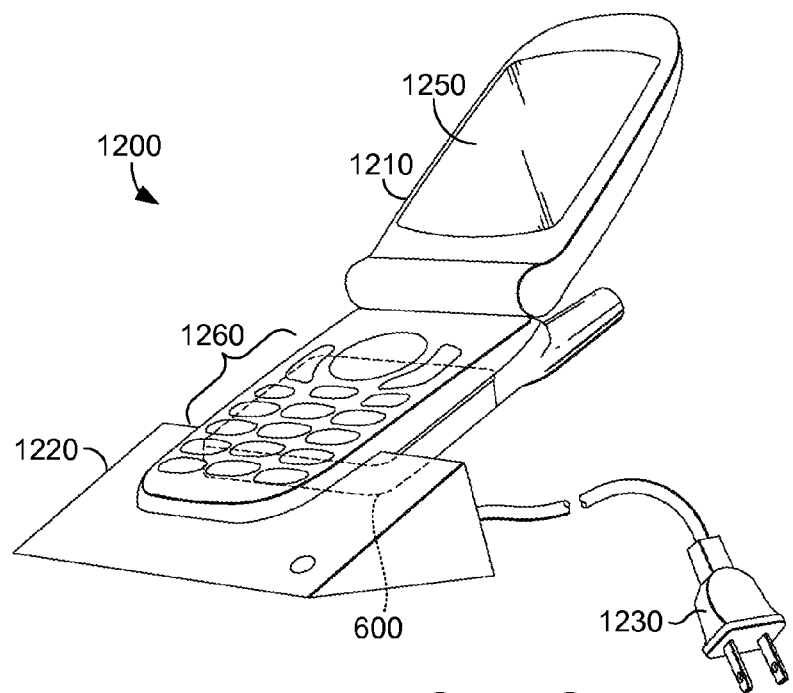
FIG. 12 is a perspective view of an exemplary modular mobile device that has form factors replicating a hinged clamshell design, in accordance with an embodiment of the present invention.

With reference to FIG. 12, a perspective view of an exemplary modular mobile device 1200 that has form factors replicating a hinged clamshell design is shown, in accordance with an embodiment of the present invention. Initially, the modular mobile device 1200 includes the core module 600 engaged to, and disposed within, a shell module 1210. The shell module 1210 includes constituent components comprising a display panel 1250 and a numeric keypad 1260. In addition, the shell module 1210 includes a recharging jack (not shown) electrically connected to a cradle 1220 that may accept a flow of power via a wire 1230. As discussed above, the flow of power may be transferred to the core module through the I/O interface to recharge the power-supply component (not shown) internal thereto.

Figure 13:
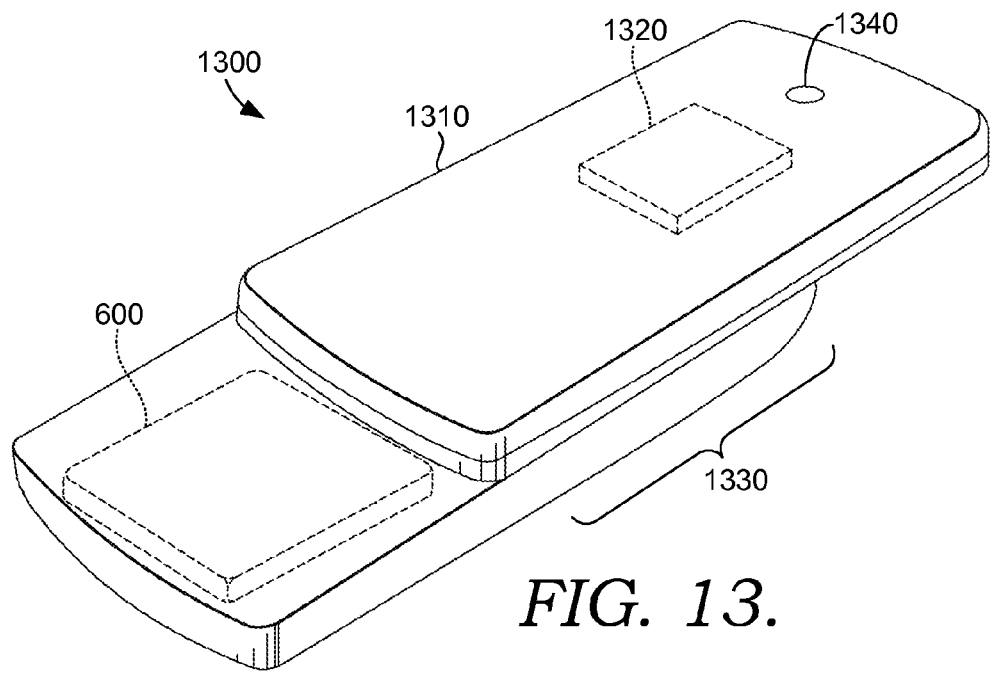
FIG. 13 is a perspective view of an exemplary modular mobile device that has form factors replicating a slider design, in accordance with an embodiment of the present invention.

Turning to FIG. 13, a perspective view of an exemplary modular mobile device 1300 that has form factors replicating a slider design 1330 is shown, in accordance with an embodiment of the present invention. Initially, the modular mobile device 1300 includes the core module 600 engaged to, and disposed within, a shell module 1310. The shell module 1310 includes form factors of constituent components comprising a camera element 1340 and an extended memory 1320 to locally retain images captured by the camera element 1340, and an aesthetic aspect of a slim profile.

Figure 14A:
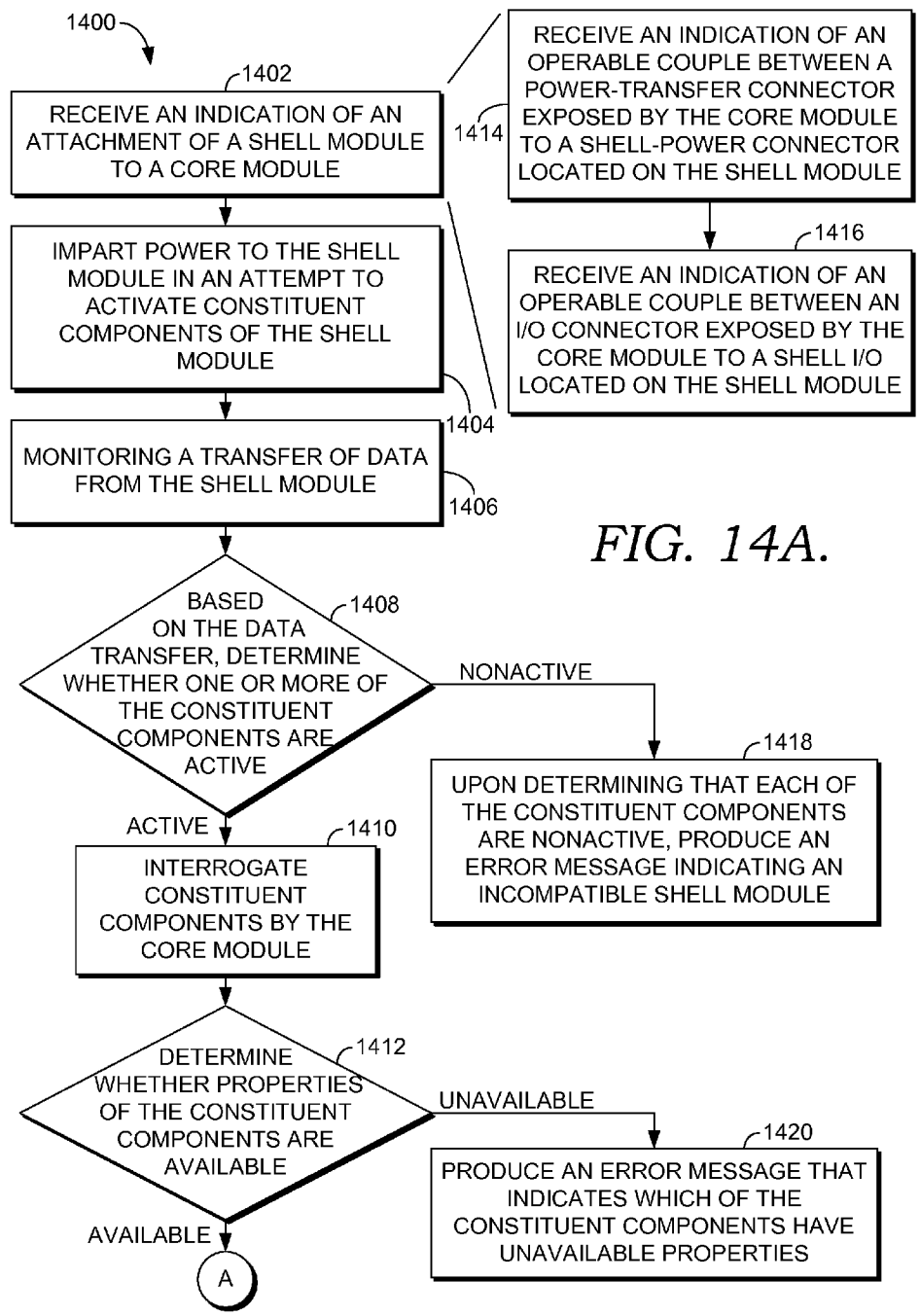
FIGS. 14A, B, and C are flow diagram showing an overall method for attaching a shell module to a core module, in accordance with an embodiment of the present invention.
Figure 14B:
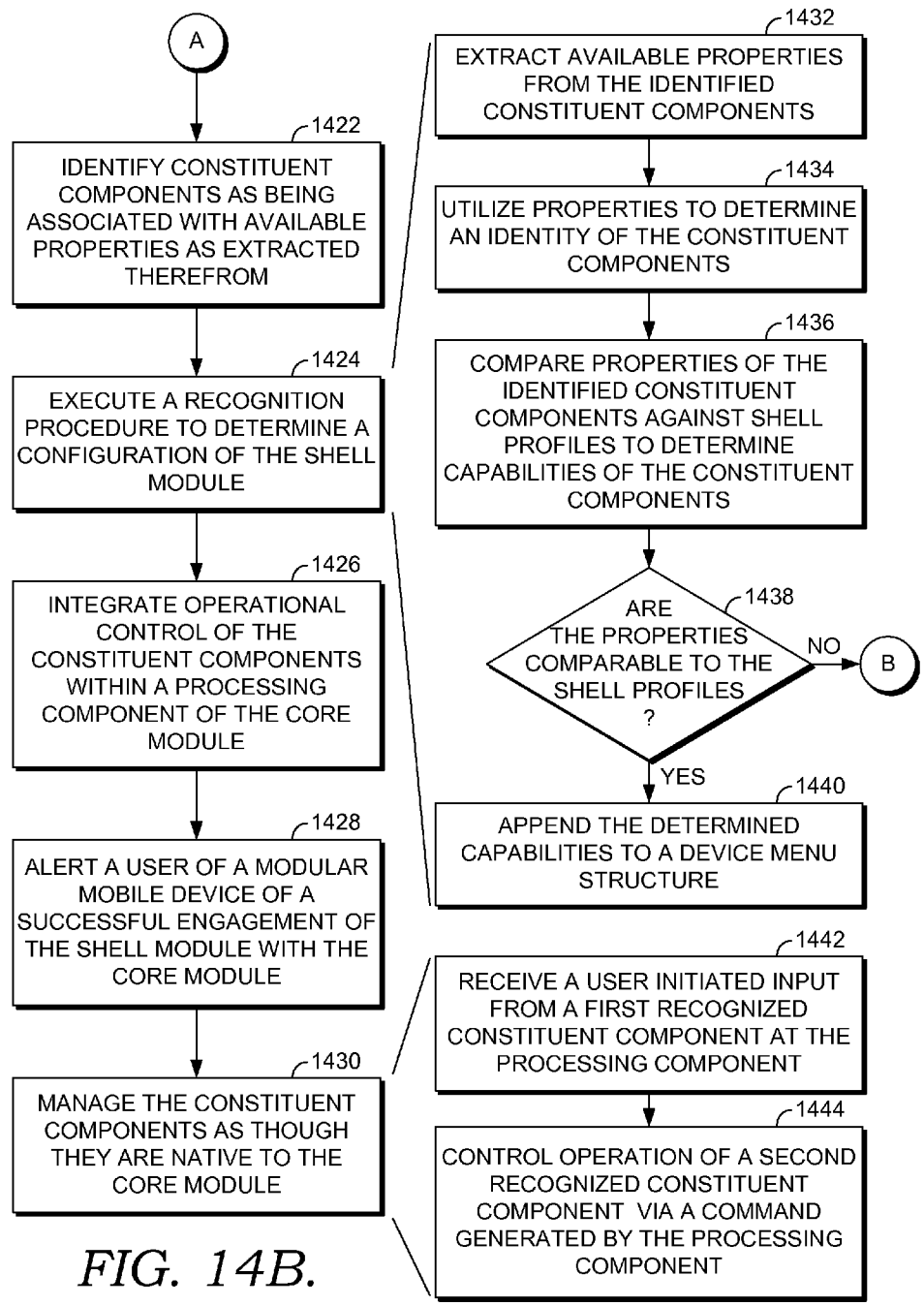
Figure 14C:
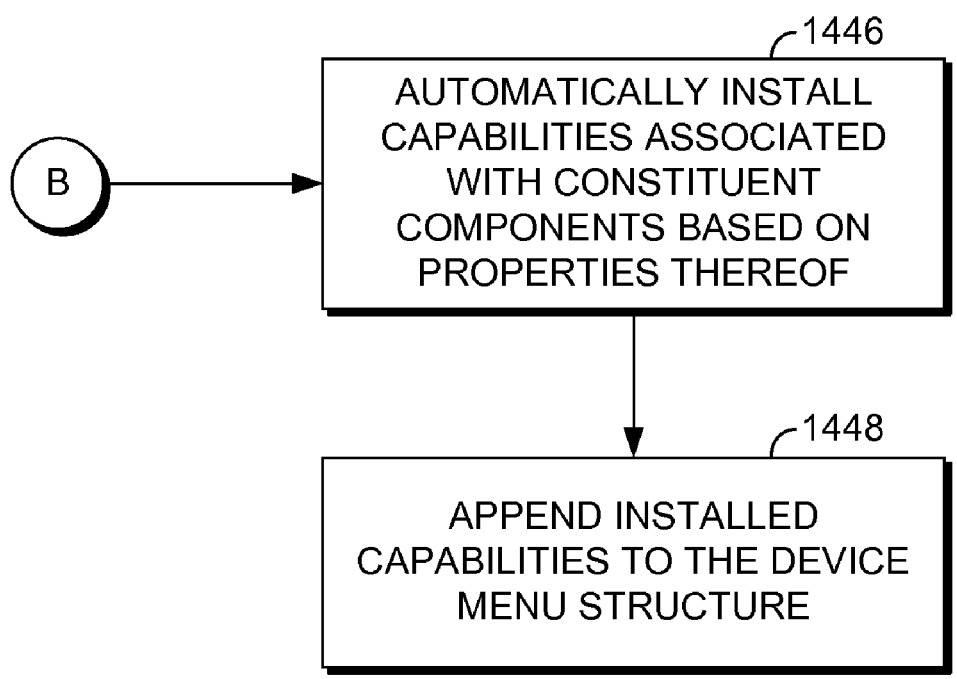

Referring now to FIG. 14, a flow diagram is illustrated that shows an overall method 1400 for attaching a shell module to a core module, in accordance with an embodiment of the present invention. Although the terms "step" and "block" are used hereinbelow to connote different elements of methods employed, the terms should not be interpreted as implying any particular order among or between various steps herein disclosed unless and except when the order of individual steps is explicitly described.

Initially, an indication of an attachment of a core module to a shell module is received, as indicated at block 1402. In embodiments, receiving the indication may include the following processes: receiving an indication of an operable couple between a power-transfer connector exposed by the core module to a shell-power connector located on the shell module (see block 1414), and receiving an indication of an operable couple between an I/O connector exposed by the core module to a shell I/O located on the shell module (see block 1416). As depicted at block 1404, power is imparted to the shell module in an attempt to activate constituent components of the shell module. The transfer of data is monitored from the shell module, as depicted at block 1406.

Based on the monitored transfer of data, a determination of whether one or more of the constituent components are active is performed, as indicated at block 1408. If, upon determination, the constituent components are identified as nonactive, an error message is produced that indicates the shell module is incompatible with the core module, as indicated at block 1418. Otherwise, the constituent components are interrogated by the core module, as indicated at block 1410.

Incident to interrogation, a determination of whether properties of the constituent components are available is performed, as indicated at block 1412. If it is determined that the constituent components have unavailable properties, an error message is produced indicating the inability to identify the constituent components, as indicated at block 1420. Otherwise, the constituent components are identified as being associated with the available properties that are extracted therefrom, as indicated at block 1422.

As indicated at block 1424, a recognition procedure to determine a configuration of the shell module is executed. In a particular embodiment, the recognition procedure includes but is not limited to, the following procedures, in no particular order: extracting available properties from the identified constituent components (see block 1432), utilizing the properties to determine an identity of the constituent components (see block 1434), and comparing the properties of the identified constituent components against shell profiles to determine capabilities of the constituent components (see block 1436). The recognition procedure may further include determining whether the properties of the constituent components are comparable to the shell profiles, as indicated at block 1438. If the properties are comparable, the determined capabilities are appended to a device menu structure, as indicated at block 1440. Otherwise, the capabilities associated with the constituent components, based on the properties thereof, may be automatically installed (see block 1446), and the installed capabilities may be appended to the device menu structure (see block 1448).

Returning to FIG. 14B, as indicated at block 1426, the operation control of the constituent components are integrated within the processing component of the core module. As indicated at block 1428, a user may be alerted of the successful engagement of the core module to the shell module. As indicated at block 1430, the constituent components are managed as if native to the core module. In embodiments, managing may include the exemplary situation of receiving a user-initiated input from a first recognized constituent component at the processing component (see block 1442) and controlling operation of a second recognized constituent component via a command generated by the processing component (see block 1444).

Figure 15:
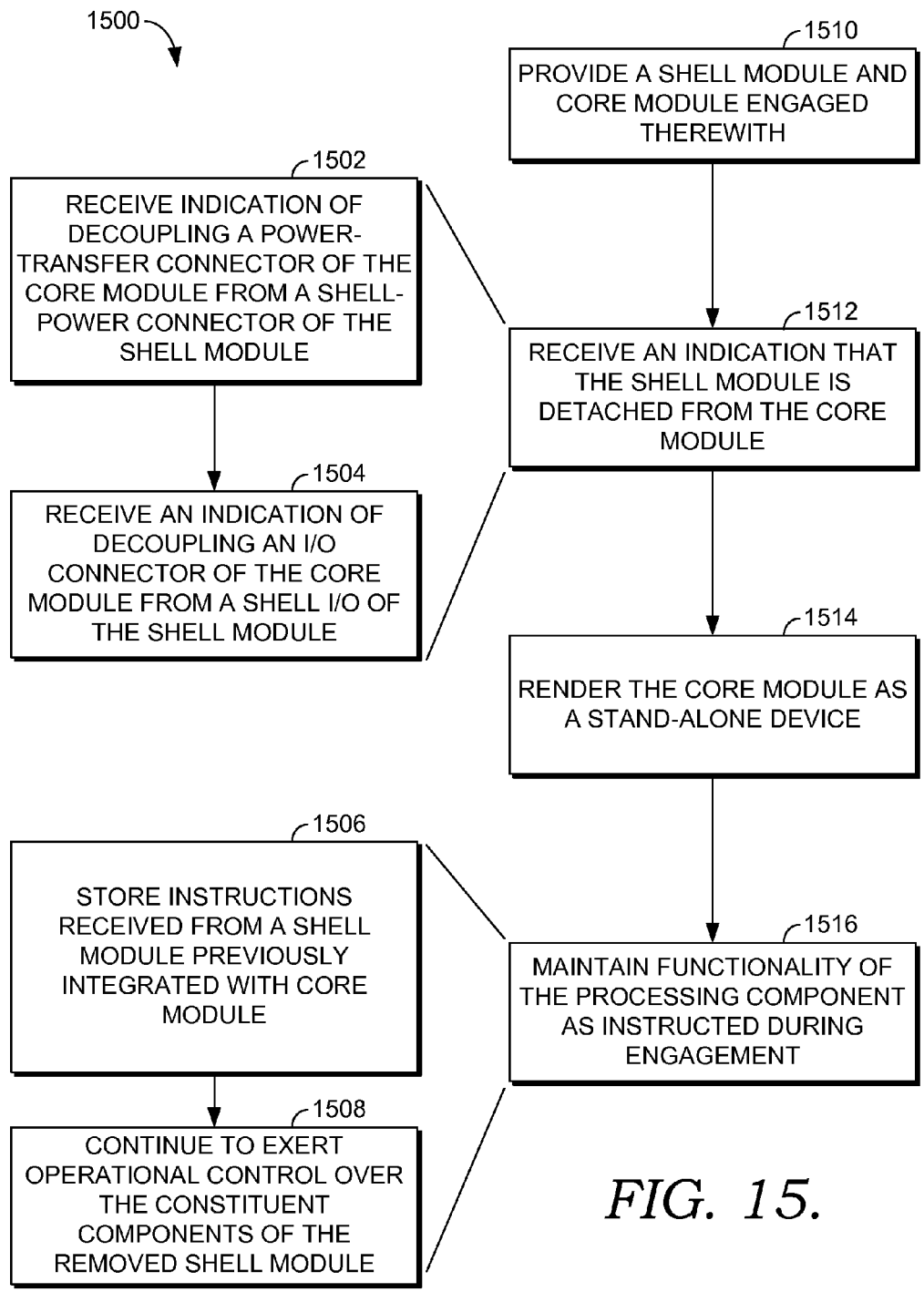
FIG. 15 is a flow diagram showing an overall method for disengaging a shell module from a core module, in accordance with an embodiment of the present invention.

Turning to FIG. 15, a flow diagram showing an overall method 1500 for disengaging a shell module from a core module is depicted, in accordance with an embodiment of the present invention. Initially, as depicted at block 1510, a shell module is provided with a core module engaged therewith, thereby exerting operational control over the shell module. As indicated at block 1512, an indication that the shell module is detached, or otherwise disengaged, from the core module is received. Receiving an indication may include receiving an indication of decoupling a power-transfer connector of the core module from a shell-power connector of the shell module (see block 1502), and receiving an indication of decoupling an I/O connector of the core module from a shell I/O of the shell module (see block 1504). Accordingly, as indicated at block 1514, the core module is rendered as a stand-alone device.

As indicated at block 1516, the functionality of the processing component is maintained as instructed during engagement. In embodiments, maintaining function in a persistent state may include, storing instructions received from a shell module previously integrated with the core module (see block 1506), and continuing to exert operational control over the constituent components of the removed shell module (see block 1508).

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A modular mobile device for apportioning operation control of constituent components integral within a shell module to a core module, the modular mobile device comprising:

the shell module including a set of form factors replicating features of a particular style of handset device, wherein the form factors comprise:
 (1) aesthetic aspects influencing the external appearance of the modular mobile device; and
 (2) the constituent components providing a portion of the functional capabilities of the modular mobile device;

the core module to manage the constituent components upon engagement with the shell module, the core module comprising:
 (1) a power-source component to supply power to the shell module thereby activating the constituent components such that they are detectable by the core module;
 (2) a processing component to control the operations of the constituent components upon the detection thereof; and
 (3) a radio component to promote communication between the modular mobile device and a wireless network,
 wherein the components of the core module and the constituent components of the shell module are mutually exclusive; and the core module to manage the constituent components upon disengaging with the shell module and rendering the core module a standalone device, wherein managing the constituent components comprises receiving instructions at the processing component during engagement with the shell module, storing the instructions at the core module, and continuing to exert operational control of at least one constituent component associate with the shell module according to the instructions.

2. The modular mobile device of claim 1, wherein the core module further comprises a light-emitting element actuated according to an illumination scheme, wherein the illumination scheme is derived from a status of the modular mobile device.

3. The modular mobile device of claim 1, wherein the core module further comprises a memory component locally storing a system architecture including an operating system, applications, shell profiles, user-defined preferences, component drivers, and a file structure, wherein the system architecture is transferable to another shell module upon engaging the core module therewith, and wherein the memory component is accessible by the processing component to facilitate operably controlling the constituent components.

4. The modular mobile device of claim 1, wherein the core module exposes an input/output (I/O) interface engageable to an I/O interface located on the shell module,
wherein the I/O interface exposed by the core module comprises:
(1) an I/O connector communicatively connected to the processing component; and
(2) a power-transfer connector electrically connected to the power-source component,
wherein the I/O interface located on the shell module comprises:
(1) a shell I/O connector communicatively connected to the constituent components and is operably coupled to the I/O connector of the core module during engagement of the shell module therewith; and
(2) a shell-power connector electrically connected to the constituent components and is operably coupled to the power-transfer connector of the core module during engagement of the shell module therewith.

5. The modular mobile device of claim 1, wherein the constituent components comprise at least one of a keyboard, a touchpad, a primary display, a secondary display, a speaker, a receiver, a numeric keypad, or a camera element.

6. The modular mobile device of claim 1, wherein the aesthetic aspects of the shell module comprise at least one of a hinged clamshell design, a ruggedized case, a slider mechanism, a headset jack, a charging jack, a PDA-style case, or a thinline-style case.

7. The modular mobile device of claim 6, wherein the power-source component is chargeable upon connection of the charging jack, located on the shell module, to an appropriate external power supply, wherein power from the external power supply flows to the power-source component via the power-transfer connector of the I/O interface exposed by the core module.

8. A computerized method for engaging a core module and a shell module to function as a modular mobile device, the computerized method comprising:
receiving an indication of the shell module attaching to the core module, wherein a power-source component and a processing component are integral to the core module while the shell module includes constituent components that are mutually exclusive from the components of the core module;
imparting power to the shell module from the power-source component, thereby attempting to activate the constituent components of the shell module;
when activated, executing a recognition procedure to determine a configuration of the shell module, wherein the recognition procedure comprises:
(1) extracting available properties from the constituent components; and
(2) utilizing the properties to determine an identity of each of the constituent components;
incident to recognizing the constituent components, integrating operational control of the constituent components with the processing component such that the processing component manages the constituent components as though they are native to the core module;
decoupling the core module from the shell module, thereby rendering the core module a standalone device; and
maintaining functionality of the processing component as previously instructed when engaged to the shell module, wherein maintaining functionality of the processing component comprises storing instructions received from a corollary shell module previously integrated with the core module, and continuing to exert operational control of the corollary shell module according to the instructions.

9. The computerized method of claim 8, wherein receiving an indication of the shell module attaching to the core module comprises:
detecting an operable coupling of a power-transfer connector exposed by the core module to a shell-power connector located on the shell module, wherein the power-transfer connector is electrically connected to the power-source component thereby allowing the core module to impart power to the shell module; and
detecting an operable coupling of an input/output (I/O) connector exposed by the core module to a shell I/O located on the shell module, wherein the I/O connector is communicatively connected to the processor component.

10. The computerized method of claim 9, further comprising maintaining awareness that the shell component is in operable communication with the core component by monitoring the integrity of the coupling of the I/O connector to the shell I/O.

11. The computerized method of claim 8, the recognition procedure further comprising:
interrogating the constituent components to determine whether the properties thereof are available or unavailable;
when the properties are unavailable, producing an error message indicating one or more of the constituent components associated with the unavailable properties; and
otherwise, identifying the constituent components associated with the available properties extracted therefrom.

12. The computerized method of claim 8, further comprising:
receiving a user-initiated input from a first recognized constituent component at the processing component; and
controlling operation of a second recognized constituent component via a command generated by the processing component in response to the user-initiated input.

13. The computerized method of claim 9, wherein attempting to activate the constituent components of the shell by imparting power thereto comprises:
administering power from the power-transfer connector to the shell-power connector via the operable coupling of the shell module and the core module;
monitoring the data transfer between the shell I/O located on the shell module and the I/O connector exposed by the core module;
based on the data transfer, determining whether one or more of the constituent components are activated; and when each of the constituent components are deactivated, producing an error message indicating an incompatible shell module.

14. The computerized method of claim 8, wherein integrating operational control of the constituent components with the processing component comprises:

comparing the properties of the identified constituent components against shell profiles to determine capabilities of the identified constituent components, wherein the shell profiles include a list of the capabilities intrinsic to various constituent components; and appending the determined capabilities to a device menu structure thereby allowing the processing component to manage the constituent components in concert with the components integral to the core module.

15. The computerized method of claim 14, wherein integrating operational control of the constituent components with the processing component further comprises:

determining that the properties of one or more of the identified constituent components are absent from the shell profiles;

automatically installing capabilities associated with the one or more of the identified constituent components based on properties thereof; and appending the installed capabilities to the device menu structure.

16. The computerized method of claim 15, wherein integrating operational control of the constituent components with the processing component further comprises:

utilizing the device menu structure to instantiate a driver element within the processing component to operably control each of the constituent components; and rendering the constituent components functional.

17. The computerized method of claim 8, further comprising alerting a user of the modular mobile device that the core module and the shell module are successfully engaged.

18. The computerized method of claim 8, further comprising:

operably coupling a corollary shell module to the shell module, wherein the corollary shell module includes supplemental constituent components that are mutually exclusive from the components integral to the core module;

automatically executing the recognition procedure to determine a configuration of the corollary shell module; and integrating operational control of the supplemental constituent components with the processing component such that the constituent components, the supplemental constituent components, and the components integral to the core module act in concert under the management of the processing component.

19. A method for disengaging a core module and a shell module previously functioning as a modular mobile device, the computerized method comprising:

providing the shell module and the core module, wherein a power-source component and a processing component are integral to the core module while the shell module includes constituent components that are mutually exclusive from the components of the core module, and wherein operational control of the constituent components is integrated within the processing component such that the processing component manages the constituent components as native to the core module; and detaching the shell module from the core module, wherein detaching comprises:

(1) decoupling a power-transfer connector exposed by the core module from a shell-power connector located on the shell module thereby disallowing the core module to impart power to the shell module, wherein the power-transfer connector is electrically connected to the power-source component;

(2) decoupling an input/output (I/O) connector exposed by the core module from a shell I/O located on the shell module thereby disarticulating operable control of the constituent components from the processing component, wherein the I/O connector is communicatively connected to the processor component;

(3) rendering the core module a standalone device; and (4) maintaining functionality of the processing component as previously instructed when engaged to the shell component, wherein maintaining functionality of the processing component comprises storing instructions received from a corollary shell module previously integrated with the core module, and continuing to exert operational control of the corollary shell module according to the instructions.

* * * * *